United States Patent
Pocovi et al.

(10) Patent No.: US 12,074,715 B2
(45) Date of Patent: Aug. 27, 2024

(54) JITTER CONTROL WITH HYBRID AUTOMATIC REPEAT REQUEST PROCESS

(71) Applicant: Nokia Technologies Oy, Espoo (FI)

(72) Inventors: Guillermo Pocovi, Aalborg (DK); Troels Emil Kolding, Klarup (DK); Klaus Hugl, Vienna (AT); Renato Barbosa Abreu, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/033,116

(22) PCT Filed: Oct. 21, 2020

(86) PCT No.: PCT/EP2020/079551
§ 371 (c)(1),
(2) Date: Apr. 21, 2023

(87) PCT Pub. No.: WO2022/083854
PCT Pub. Date: Apr. 28, 2022

(65) Prior Publication Data
US 2023/0412315 A1 Dec. 21, 2023

(51) Int. Cl.
*G06F 11/07* (2006.01)
*H04L 1/1829* (2023.01)

(52) U.S. Cl.
CPC .......... *H04L 1/1835* (2013.01); *H04L 1/1864* (2013.01)

(58) Field of Classification Search
CPC ............................. H04L 1/1864; H04L 1/1835
See application file for complete search history.

(56) References Cited

U.S. PATENT DOCUMENTS

| | | | |
|---|---|---|---|
| 7,864,799 B2 * | 1/2011 | Sachs | H04L 1/1809 370/466 |
| 10,631,171 B2 * | 4/2020 | Song | H04L 12/6418 |
| 10,841,045 B2 * | 11/2020 | Lee | H04L 1/1887 |
| 11,476,985 B2 * | 10/2022 | Xiong | H04L 5/0055 |
| 11,690,050 B2 * | 6/2023 | Gao | H04W 72/04 370/329 |
| 11,711,171 B2 * | 7/2023 | Salem | H04L 1/1819 370/329 |
| 11,930,479 B2 * | 3/2024 | Mondal | H04W 16/02 |
| 2018/0295542 A1 | 10/2018 | Yi et al. | |
| 2020/0205107 A1 | 6/2020 | Prakash et al. | |
| 2021/0243087 A1 * | 8/2021 | Babaei | H04L 1/1864 |
| 2022/0046689 A1 * | 2/2022 | Lee | H04L 5/0053 |
| 2022/0361212 A1 * | 11/2022 | Mu | H04L 1/1822 |

* cited by examiner

*Primary Examiner* — Guy J Lamarre
(74) *Attorney, Agent, or Firm* — Harrington & Smith

(57) ABSTRACT

Various example embodiments provide efficient jitter control by means of a hybrid automatic repeat request (HARQ) process. A base station may transmit to a UE a forwarding time parameter for data packet(s) associated with a HARQ process. The UE 110 may store the data packet(s) in a HARQ buffer and determine to hold the data packet(s) in the HARQ buffer until a delivery time determined based on the forwarding time parameter. Once the delivery time has been reached, the UE may forward the data packets to higher protocol layers. This enables efficient jitter control of a data packet flow. Apparatuses, methods, and computer programs are disclosed.

20 Claims, 5 Drawing Sheets

JITTER CONTROL WITH HYBRID AUTOMATIC REPEAT REQUEST PROCESS

CROSS REFERENCE TO RELATED APPLICATION

This patent application is a U.S. National Stage application of International Patent Application Number PCT/EP2020/079551 filed Oct. 21, 2020, which is hereby incorporated by reference in its entirety.

TECHNICAL FIELD

Various example embodiments generally relate to the field of data communications. In particular, some example embodiments relate to jitter control in cellular communication networks with a hybrid automatic repeat request (HARQ) process.

BACKGROUND

In various wireless communication technologies, such as 3GPP long-term evolution (LTE) 4G and 5G new radio (NR), a client node such as a user equipment (UE) may communicate with one or more network nodes over wireless radio channels. Delivery of data packets in such a network may be bound to certain requirements such as for example a certain delay window or a certain time interval where the data shall be delivered. Even if a low delay target were configured, data packets could be delivered at any time within the delay window, thereby causing jitter in the data packet flow. Some applications consuming the data may not be able to tolerate such jitter.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide an efficient solution for jitter control in communication networks. This benefit may be achieved by the features of the independent claims. Further implementation forms are provided in the dependent claims, the description, and the drawings.

According to an aspect, an apparatus may comprise at least one processor and at least one memory including computer program code, the at least one memory and the computer code configured to, with the at least one processor, cause the apparatus at least to: receive a forwarding time parameter for at least one data packet, wherein the forwarding time parameter is associated with a hybrid automatic repeat request process; receive the at least one data packet; assign the at least one data packet to a hybrid automatic repeat request buffer; determine a delivery time for the at least one data packet based on the forwarding time parameter; and deliver the at least one data packet from the hybrid automatic repeat request buffer to at least one higher protocol layer, in response to detecting the delivery time.

According to an example embodiment, the at least one memory and the computer code may be further configured to, with the at least one processor, cause the apparatus to: receive an identifier of the hybrid automatic repeat request process associated with the at least one data packet and the forwarding time parameter.

According to an example embodiment, the at least one memory and the computer code may be further configured to, with the at least one processor, cause the apparatus to: receive an indication of the forwarding time parameter in downlink control information.

According to an example embodiment, the at least one memory and the computer code may be further configured to, with the at least one processor, cause the apparatus to: receive a radio resource control configuration comprising a mapping between values of the forwarding time parameter and values of a downlink control information field comprising the indication of the forwarding time parameter.

According to an example embodiment, the at least one memory and the computer code may be further configured to, with the at least one processor, cause the apparatus to: receive a radio resource control configuration comprising the forwarding time parameter, wherein the forwarding time parameter is relative to a semi-persistently scheduled transmission of the at least one data packet.

According to an example embodiment, the at least one memory and the computer code may be further configured to, with the at least one processor, cause the apparatus to: transmit an acknowledgement of the at least one data packet before the delivery time.

According to an example embodiment, the at least one memory and the computer code may be further configured to, with the at least one processor, cause the apparatus to: transmit a negative acknowledgement of the at least one data packet; receive an updated forwarding time parameter for the at least one data packet; receive at least one retransmission of the at least one data packet; update the delivery time for the at least one data packet based on the updated forwarding time parameter.

According to an example embodiment, the at least one memory and the computer code may be further configured to, with the at least one processor, cause the apparatus to: determine the delivery time based on a sum of a minimum processing time for the at least one data packet and the forwarding time parameter.

According to an example embodiment, the indication of the forwarding time parameter comprises an indication of a hybrid automatic repeat request feedback timing indicator, and the at least one memory and the computer code may be further configured to, with the at least one processor, cause the apparatus to: receive an indication or configuration of use of the hybrid automatic repeat request timing indicator as the indication of the forwarding time parameter; and transmit an acknowledgement of the at least one data packet and forward the at least one data packet, in response to detecting the delivery time.

According to an example embodiment, the at least one memory and the computer code may be further configured to, with the at least one processor, cause the apparatus to: a flag in downlink control information, a dedicated radio network temporary identifier associated with transmission of the downlink control information, or a radio resource control configuration.

According to an example embodiment, the forwarding time parameter is associated with configuration of the semi-persistent scheduling of the transmission of the at least one data packet, or wherein the forwarding time parameter is included in downlink control information indicated to activate the semi-persistent scheduling of the transmission of the at least one data packet.

According to an example embodiment, the at least one memory and the computer code may be further configured to, with the at least one processor, cause the apparatus to:

receive, before the delivery time, a request to forward at least one previously successfully received data packet from the hybrid automatic repeat request buffer; and forward the at least one previously successfully received data packet from the hybrid automatic repeat request buffer before the delivery time, in response to the request to forward the at least one previously successfully received data packet from the hybrid automatic repeat request buffer.

According to an example embodiment, the request to forward the at least one previously successfully received data packet from the hybrid automatic repeat request buffer comprises downlink control information scheduling a transmission of the at least one data packet with a toggled new data indicator. The transmission of the at least one data packet may be associated with the hybrid automatic repeat request process.

According to an example embodiment, the at least one memory and the computer code may be further configured to, with the at least one processor, cause the apparatus to: receive, before the delivery time, a request to discard (the) at least one previously successfully received data packet from the hybrid automatic repeat request buffer; and discard the at least one previously successfully received data packet from the hybrid automatic repeat request buffer, in response to the request to discard the at least one previously successfully received data packet from the hybrid automatic repeat request buffer.

According to an aspect an apparatus may comprise at least one processor; and at least one memory including computer program code, the at least one memory and the computer code configured to, with the at least one processor, cause the apparatus at least to: transmit a forwarding time parameter for at least one data packet, wherein the forwarding time parameter is associated with a hybrid automatic repeat request process; and transmit the at least one data packet.

According to an example embodiment, the at least one memory and the computer code may be further configured to, with the at least one processor, cause the apparatus to: transmit an identifier of the hybrid automatic repeat request process associated with the at least one data packet and the forwarding time parameter.

According to an example embodiment, the at least one memory and the computer code may be further configured to, with the at least one processor, cause the apparatus to: transmit an indication of the forwarding time parameter in downlink control information.

According to an example embodiment, the at least one memory and the computer code may be further configured to, with the at least one processor, cause the apparatus to: transmit a radio resource control configuration comprising a mapping between values of the forwarding time parameter and values of a downlink control information field comprising the indication of the forwarding time parameter.

According to an example embodiment, the at least one memory and the computer code may be further configured to, with the at least one processor, cause the apparatus to: transmit a radio resource control configuration comprising the forwarding time parameter, wherein the forwarding time parameter is relative to a semi-persistently scheduled transmission of the at least one data packet.

According to an example embodiment, the at least one memory and the computer code may be further configured to, with the at least one processor, cause the apparatus to: receive a negative acknowledgement of the at least one data packet; transmit an updated forwarding time parameter for the at least one data packet; and retransmit the at least one data packet.

According to an example embodiment, the indication of the forwarding time parameter comprises an indication of a hybrid automatic repeat request feedback timing indicator, and the at least one memory and the computer code may be further configured to, with the at least one processor, cause the apparatus to: transmit an indication or configuration of use of the hybrid automatic repeat request timing indicator as the indication of the forwarding time parameter.

According to an example embodiment, the indication or configuration of the use of the hybrid automatic repeat request timing indicator as the indication of the forwarding time comprises one of: a flag in downlink control information, a dedicated radio network temporary identifier associated with transmission of the downlink control information, or a radio resource control configuration.

According to an example embodiment, the forwarding time parameter is associated with configuration of the semi-persistent scheduling of the transmission of the at least one data packet, or wherein the forwarding time parameter is included in downlink control information indicated to activate the semi-persistent scheduling of the transmission of the at least one data packet.

According to an example embodiment, the at least one memory and the computer code may be further configured to, with the at least one processor, cause the apparatus to: transmit a request to forward at least one previously successfully received data packet from a hybrid automatic repeat request buffer.

According to an example embodiment, the request to forward the at least one previously successfully received data packet from the hybrid automatic repeat request buffer comprises downlink control information scheduling a transmission of the at least one data packet with a toggled new data indicator. The transmission of the at least one data packet may be associated with the hybrid automatic repeat request process.

According to an example embodiment, the at least one memory and the computer code may be further configured to, with the at least one processor, cause the apparatus to: transmit a request to discard (the) at least one previous successfully received data packet from a hybrid automatic repeat request buffer.

According to an aspect, a method may comprise: receiving a forwarding time parameter for at least one data packet, wherein the forwarding time parameter is associated with a hybrid automatic repeat request process; receiving the at least one data packet; assigning the at least one data packet to a hybrid automatic repeat request buffer; determining a delivery time for the at least one data packet based on the forwarding time parameter; and delivering the at least one data packet from the hybrid automatic repeat request buffer to at least one higher protocol layer, in response to detecting the delivery time.

According to an aspect, a method may comprise transmitting a forwarding time parameter for at least one data packet, wherein the forwarding time parameter is associated with a hybrid automatic repeat request process; and transmitting the at least one data packet.

According to an aspect, a computer program may comprise instructions for causing an apparatus to perform at least the following: receiving a forwarding time parameter for at least one data packet, wherein the forwarding time parameter is associated with a hybrid automatic repeat request process; receiving the at least one data packet; assigning the at least one data packet to a hybrid automatic repeat request buffer; determining a delivery time for the at least one data packet based on the forwarding time parameter; and delivering the at least one data packet from the hybrid automatic repeat request buffer to at least one higher protocol layer, in response to detecting the delivery time.

According to an aspect, a computer program may comprise instructions for causing an apparatus to perform at least the following: transmitting a forwarding time parameter for at least one data packet, wherein the forwarding time parameter is associated with a hybrid automatic repeat request process; and transmitting the at least one data packet.

According to an aspect, an apparatus may comprise means for receiving a forwarding time parameter for at least one data packet, wherein the forwarding time parameter is associated with a hybrid automatic repeat request process; means for receiving the at least one data packet; means for assigning the at least one data packet to a hybrid automatic repeat request buffer; means for determining a delivery time for the at least one data packet based on the forwarding time parameter; and means for delivering the at least one data packet from the hybrid automatic repeat request buffer to at least one higher protocol layer, in response to detecting the delivery time.

According to an aspect, an apparatus may comprise means for transmitting a forwarding time parameter for at least one data packet, wherein the forwarding time parameter is associated with a hybrid automatic repeat request process; and means for transmitting the at least one data packet.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Figure 1:
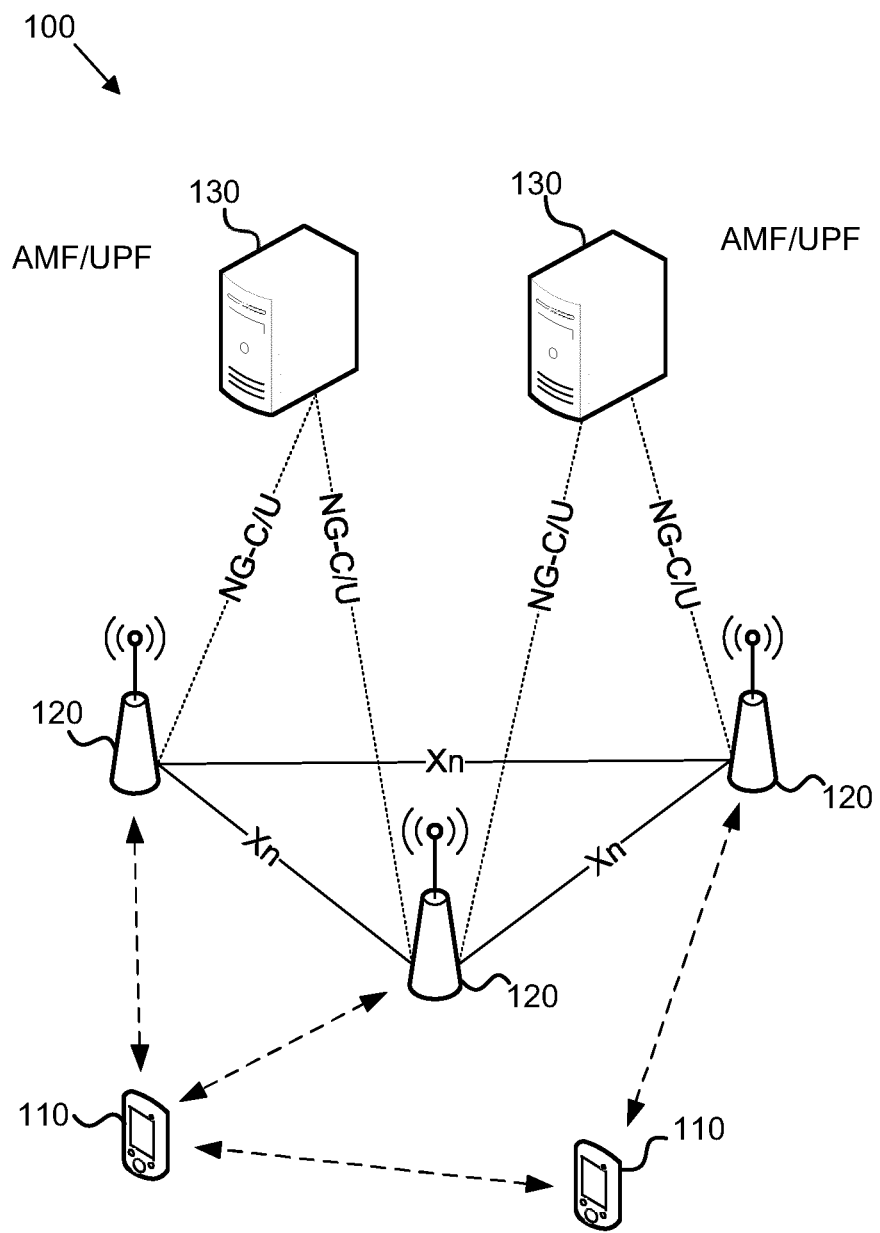
FIG. 1 illustrates an example of a communication network comprising network nodes and client nodes, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Support for deterministic traffic, for example IP (internet protocol) or general Ethernet data flows for which the characteristics of the traffic are known a priori, may be considered in standardization of communication networks. Such support may be provided for example for time sensitive networking (TSN) or time sensitive communications (TSC). Furthermore, use-cases beyond the factory, where the data traffic is deterministic and where packet delivery is bound to a certain delay window (cf. jitter), may be considered.

One approach for controlling the delay window (jitter) is based on a two-fold solution. The radio access network (RAN) may be allowed to have a delay up to a configured AN (access network) PDB (packet delay budget), but there may be no control of jitter at the RAN side. A packet delay budget (PDB) may comprise an upper bound for an acceptable delay for a data packet. This means that the delay experienced by a packet may be any feasible value up to the AN PDB. For example, for a 10 ms AN PDB, the actual delay variation could therefore be anything from approximately 0.5 ms up to 10 ms and therefore a delay variation may be close to the AN PDB. However, the jitter of the data packet delivery may be controlled at the UE side.

In TSN, for example when 5G is configured as an Ethernet bridge and supports IEEE 802.1Qbv mechanisms, it may be desired to control jitter at one microsecond level. One solution to enable this is to add jitter control hardware after the UE in the device. This hardware may be denoted DS-TT (device side TSN translator) and it may include a hold-and-forward (H & F) buffer. This means that even if the RAN had a large delay variation (e.g. up to the maximum allowed AN PDB), the H & F buffer in the device may hold the data packet and not deliver it until the right time. In other applications, for example for general non-TSN Ethernet and IP sessions such as those used in the audio and video production industry, jitter may need to be controlled without the H & F functionality. For some applications it may be desired to use a non-H & F based approach which may rely on external hardware that is not standardized. However, a UE may not have any processing requirement above the physical layer for user plane and therefore having an external H & F also does not allow for consistency in a way controllable and testable by standardization bodies, for example RAN4 in 3GPP.

Some example embodiments of the present disclosure have been described in the context of downlink direction, because they may have a direct UE impact and standardization of the disclosed features may be therefore desired. In uplink, the network may be configured with proprietary jitter control mechanisms (e.g. proprietary gate control or H & F mechanism) and such solutions may be deployed either at the gNB or the core network, for example close to the N6 interface of the UPF (user plane function). For uplink, since a network based solution may not have any UE or radio interface impact, it may be also be expected that the H & F concept may be extended to also handle Ethernet and IP PDU (packet data unit) sessions. Even though some example embodiments have been described in the context of downlink, the example embodiments are also applicable to UE-to- UE communications in sidelink, for example in UE-UE deterministic traffic scenarios, or any other type of data communications.

According to an example embodiment, a base station may transmit to a UE a forwarding time parameter for data packet(s) associated with a HARQ process. The UE 110 may store the data packet(s) in a HARQ (Hybrid Automatic Repeat Request) buffer and determine to hold the data packet(s) in the HARQ buffer until a delivery time determined based on the forwarding time, even if a HARQ acknowledgement of the data packet(s) was sent earlier. Once the delivery time has been reached, the UE may deliver the data packets to higher protocol layers. This enables efficient jitter control of a data packet flow.

For example, new fields in DCI (downlink control information) formats used for DL (downlink) PDSCH (physical downlink shared channel) scheduling to activate delayed data packet delivery to higher layers may be introduced. The new fields may be provided for example in DCI formats 1_1 and/or 1_2 and be associated with certain HARQ process identifier (ID). Furthermore, forwarding time rules on MAC (medium access control) layer based on the indication provided on physical layer may be applied. Furthermore, a UE capability indication for supporting holding of received data until an indicated and/or determined delivery time may be defined. Also, a mapping between the values of the new DCI fields and the corresponding forwarding times may be provided in RRC (radio resource control) signaling.

FIG. 1 illustrates an example of a communication network comprising network nodes and client nodes, according to an example embodiment. The communication network 100 may comprise one or more core network elements such as for example access and mobility management function (AMF) and/or user Plane function (UPF) 130, one or more base stations, represented by gNBs 120 (5th generation NodeB, gNodeB). The communication network 100 may further comprise one or more client nodes, which may be also referred to as a user nodes or user equipment (UE). For example, the network may comprise one or more UEs 110 which may communicate with one or more of the base stations via wireless radio channel(s). Downlink (DL) transmission may refer to transmission of data from a base station to a UE 110. Uplink (UL) transmission may refer to transmission of data from a UE 110 to a base station. Furthermore, the UEs 110 may communicate with (or via) each other over a sidelink connection, which may be a direct radio connection between the UEs 110.

The base stations may be configured to communicate with the core network elements over a communication interface, such as for example a control plane interface or a user plane interface NG-C/U. Base stations may be also called radio access network (RAN) nodes and they may be part of the radio access network between the core network and the UEs 110. Functionality of a base station may be distributed between a central unit (CU), for example a gNB-CU, and one or more distributed units (DU), for example gNB-DUs. Network elements AMF/UPF 130, gNB 120, gNB-CU, and gNB-DU may be generally referred to as network nodes or network devices. Although depicted as a single device, a network node may not be a stand-alone device, but for example a distributed computing system coupled to a remote radio head. For example, a cloud radio access network (cRAN) may be applied to split control of wireless functions to optimize performance and cost.

The communication network 100 may be configured for example in accordance with the 5th Generation digital cellular communication network, as defined by the 3rd Generation Partnership Project (3GPP). In one example, the communication network 100 may operate according to 3GPP 5G-NR (5G New Radio). It is however appreciated that example embodiments presented herein are not limited to this example network and may be applied in any present or future wireless or wired communication networks, or combinations thereof, for example other type of cellular networks, short-range wireless networks, broadcast or multicast networks, or the like.

Data communication in communication network 100 may be based on a protocol stack comprising various communication protocols and layers. In one example, a protocol stack at a transmitter, for example gNB 120 in case of downlink transmission, may comprise a service data adaptation protocol (SDAP) layer, which may receive data from an application layer for transmission, for example one or more data packets. The SDAP layer may be configured to exchange data with a PDCP (packet data convergence protocol) layer. The PDCP layer may be responsible of generation of PDCP data packets, for example based on data obtained from the SDAP layer.

An RRC (radio resource control) layer may be also provided on top of the PDCP layer to implement control plane functionality. RRC may refer to provision of radio resource related control data. Radio resource control messages may be transmitted on various logical control channels such as for example a common control channel (CCCH) or a dedicated control channel (DCCH). Logical control channels may be mapped to one to more signaling radio bearers (SRB).

The PDCP layer may provide data to one or more instances of an RLC (radio link control) layer. For example, the PDCP data packets may be transmitted on one or more RLC transmission legs. RLC instance(s) may be associated with corresponding MAC instances of the MAC layer. The MAC layer may deliver the data to the physical layer for transmission. In this example, the application layer may be considered to be the highest protocol layer and the physical layer may be considered to be the lowest layer. A corresponding protocol stack may be applied at a receiver, for example UE 110. Therefore, each layer at a receiver may be configured to provide the received data, for example data packets, to an upper or a higher layer of the protocol stack. For example, the MAC layer may provide the received data to the RLC layer, and so on.

The MAC layer may provide a mapping between logical channels of upper layer(s) and transport channels of the physical layer, handle multiplexing and demultiplexing of MAC service data units (SDU). Furthermore, the MAC layer may provide error correction functionality based on packet retransmissions, for example according to the hybrid automatic repeat request (HARQ) process. The HARQ buffering related methods described herein may be therefore implemented at the MAC layer. It is however appreciated that similar functionality may be implemented at other layers of the protocol stack and that signaling disclosed to enable the HARQ buffering functionality at the MAC layer may be provided on other layers, for example in radio resource control (RRC) signaling or physical layer.

Figure 2:
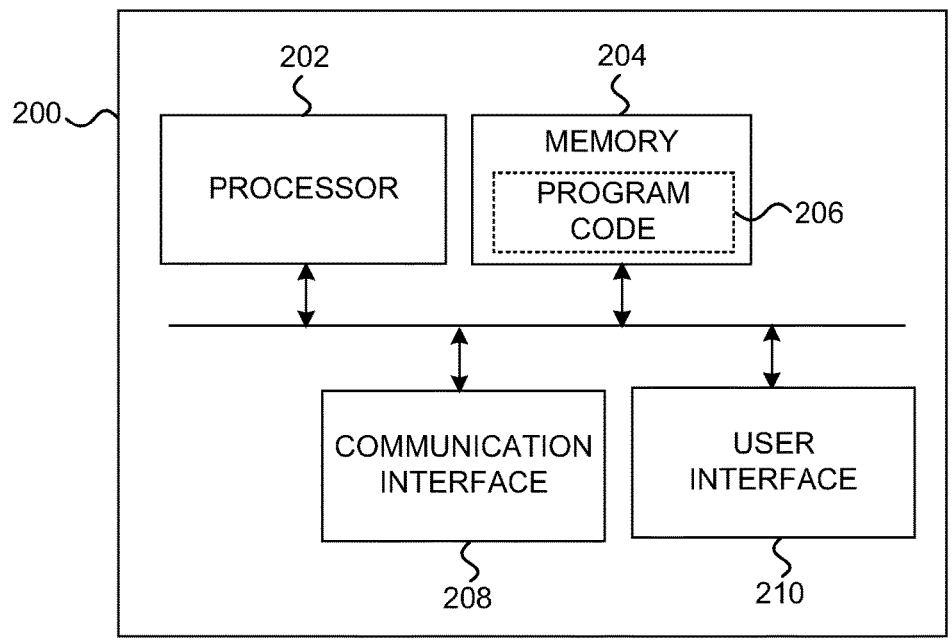
FIG. 2 illustrates an example of an apparatus configured to practice one or more example embodiments.

FIG. 2 illustrates an example embodiment of an apparatus 200, for example a client node such as for example UE 110 or a network node such as for example a gNB 120. The apparatus 200 may comprise at least one processor 202. The at least one processor 202 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 200 may further comprise at least one memory 204. The at least one memory 204 may be configured to store, for example, computer program code or the like, for example operating system software and application software. The at least one memory 204 may comprise one or more volatile memory devices, one or more non-volatile memory devices, and/or a combination thereof. For example, the at least one memory 204 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 200 may further comprise a communication interface 208 configured to enable apparatus 200 to transmit and/or receive information to/from other devices. In one example, apparatus 200 may use communication interface 208 to transmit or receive signaling information and data in accordance with at least one cellular communication protocol. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 208 may comprise, or be configured to be coupled to, at least one antenna to transmit and/or receive radio frequency signals. One or more of the various types of connections may be also implemented as separate communication interfaces, which may be coupled or configured to be coupled to one or more of a plurality of antennas.

The apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus 200 is configured to implement some functionality, some component and/or components of the apparatus 200, such as for example the at least one processor 202 and/or the at least one memory 204, may be configured to implement this functionality. Furthermore, when the at least one processor 202 is configured to implement some functionality, this functionality may be implemented using the program code 206 comprised, for example, in the at least one memory 204.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus 200 comprises means for performing at least one method described herein. In one example, the means comprises the at least one processor 202, the at least one memory 204 including program code 206 configured to, when executed by the at least one processor, cause the apparatus 200 to perform the method.

The apparatus 200 may comprise for example a computing device such as for example a base station, a server, a mobile phone, a tablet computer, a laptop, an internet of things (IoT) device, or the like. Examples of IoT devices include, but are not limited to, consumer electronics, wearables, sensors, and smart home appliances. In one example, the apparatus 200 may comprise a vehicle such as for example a car. Although apparatus 200 is illustrated as a single device it is appreciated that, wherever applicable, functions of the apparatus 200 may be distributed to a plurality of devices, for example to implement example embodiments as a cloud computing service.

Figure 3:
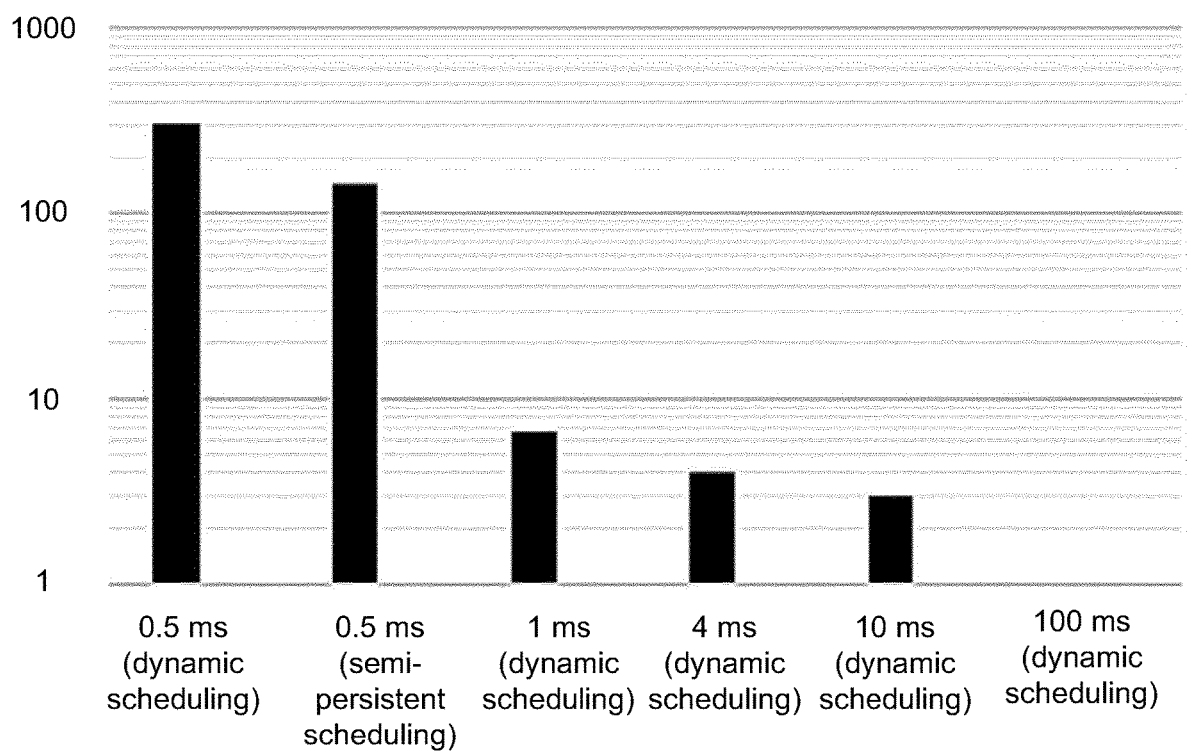
FIG. 3 illustrates an example of a radio cost associated with different packet delay budgets or jitter requirements, according to an example embodiment.

FIG. 3 illustrates an example of a radio cost associated with different packet delay budgets or jitter requirements, according to an example embodiment. Performing jitter control within the RAN may be an expensive process in the downlink in terms of capacity or spectral efficiency. For example, if a session has a 10 ms AN PDB, but is configured to deliver the packet with a 0.5 ms delay jitter, the packet delivery window being for example from 9.5 ms to 10 ms, the gNB 120 may need to hold the packet for 9 ms before it starts scheduling it. This may be done to avoid the packet arriving successfully before the allowed packet delivery window and therefore being sent onwards prematurely by the UE 110. From spectral efficiency point of view, this means that an allowed jitter window, for example the duration of the allowed packet delivery window, of N ms may be substantially equivalent of having a setting of AN PDB approximately N ms.

To understand the issue, the radio cost for ensuring various delays has been illustrated in FIG. 3. The results are based on optimizing a 5G FDD (frequency division duplex) 40 MHz solution in the 3GPP IIoT (industrial IoT) environment (Indoor Factory InF with sparse clutter—SH scenario from 3GPP TR 38.901) with multiple users per cell and with downlink FTP3 traffic with 50 byte payload size. System-level simulations have been performed to determine the maximum offered load or capacity that the system can handle while still guaranteeing a delay requirement of 1, 4, 10 or 100 ms with 99.999% reception reliability. FIG. 3 shows the relative reduction of capacity for delay requirements of 1, 4 or 10 ms as compared to the 100 ms case.

In this example, the radio cost increases significantly as the AN PDB is reduced. For instance, a network serving URLLC (ultra reliable low latency communication) traffic with 1 ms requirement can carry ⅙ or ⅐ of the data volume as compared to the case of 100 ms latency guarantee. This may be translated for example into a lower number of supported users and/or lower data rates per user if 1 ms latency and 99.999% reliability is required. The high cost is a consequence of operating with very low block error rate (BLER) targets, for example by selecting a conservative modulation and coding scheme (MCS), in the physical layer, short transmission intervals with high relative control overhead, or the like. Note that the results are based on guaranteed delays, including the 100 ms case. If comparing to a best-effort scenario, the price of URLLC may be in the order of tenfold higher. It is also seen that below the 1 ms boundary, it may not be possible to do HARQ re-transmission operation and the capacity may degrade severely, 100-300 times compared to the 100 ms case depending on whether dynamic or semi-persistent scheduling is used and guided with a priori information regarding the traffic (for example the TSC assistance information (AI) parameter, TSCAI). The cost of achieving low jitter in RAN may become even larger when assuming that multiple packets, for example from multiple UEs, are to be delivered at the same time window, for example a time window of 0.5 ms, meaning that it may not be possible to perform proper load balancing of available radio resources.

It is therefore understood that controlling jitter within the RAN for downlink may be improved. For example, in case of a service with an PDB of 10 ms that needs to have delay variation (jitter) controlled to 1 ms, the cost may be about 2× higher than for a normal ms AN PDB service. If the jitter requirement is tighter, e.g. 0.5 ms, the cost increase may be close to Therefore, controlling jitter natively in the RAN may not be desired in all applications.

Repetition scheduling is one approach to improve the spectral efficiency by leveraging the full AN PDB window. For example, the gNB 120 may plan multiple, for example four, repetitions (i.e. the data packet is sent multiple/four times from the gNB 120 to the UE 110) and ensure that the last repetition falls within the allowed jitter window. This provides some averaging of interference and fading conditions (hardening of the channel) and could slightly improve the spectral efficiency by pre-transmission before the packet delivery window. Also, using repetition enables to use less resources for each transmission, which may result in less blocking compared to a single shot transmission configured to achieve the desired jitter window. However, the RAN may not support instructing the UE 110 to forward a received packet replica to higher layers at an agreed time. Therefore, in this example the network may not be able to ensure that the UE 110 will forward the data to upper layers only after all repetitions have been received, instead of doing it upon successful reception of an early replica. Therefore, the jitter requirement may still not be guaranteed.

Example embodiments of the present disclosure provide jitter control in the RAN by means of a downlink HARQ mechanism, where transmission of a packet may be initiated well before the allowed packet delivery window and which therefore can achieve a spectral efficiency close to the AN PDB configured for that service by leveraging HARQ with various scheduling techniques that increase spectral efficiency within the PDB, for example multiple retransmissions, MU-MIMO schemes (multi-user multiple input multiple output), or the like.

According to an example embodiment, signaling information provided by gNB 120 to schedule a downlink data transmission may be adapted to instruct the UE 110 to hold the received data in its HARQ buffer, for example for a certain HARQ process identifier (ID) and/or for a specified time in the future. This forwarding time may be used at UE 110 to determine a delivery time for the buffered data packets. The delivery time may comprise a time to deliver the received data packets to the higher layers. The delivery time may be provided as an absolute time or as a relative time, for example with respect to assigning the data packet(s) in the HARQ buffer. The forwarding time may therefore comprise a holding time, or a lower limit for the holding time, for at least one data packet in the HARQ buffer of the UE 110. The forwarding time may be indicated for example by means of a number of symbols counted from the first transmission. The forwarding time may be indicated relative to a scheduled PDSCH transmission or relative to a PDCCH containing the DCI scheduling the PDSCH transmission. The forwarding time may be relative to a beginning or an end of the relevant transmission. A symbol may refer to a time domain modulation symbol or for example an OFDM symbol depending on the system where the example embodiments are applied. In general, any suitable measure for time may be used. Even if the UE 110 transmitted an acknowledgement of successful reception towards the gNB 120 (as HARQ-ACK feedback) before this time, the UE 110 may not forward the received data to higher layers before the determined delivery time. Such signaling information may be provided for example in downlink control information (DCI). An identifier of the HARQ process may be also indicated in the signaling information.

This enables very tight jitter control to a per-symbol level of the DL serving cell while at the same time ensuring that the full AN PDB window may be leveraged for (re)transmissions, thus greatly improving the spectral efficiency. Per-symbol level jitter control may enable to control jitter for example at symbol level of the PDSCH, for example down to the symbol duration of the downlink serving cell the data packet is transmitted. In some solutions the data packet may need to be transmitted at an exact point of time (within a very short time window), and there may be several packets for several users that need to be transmitted within that short time period. With the example embodiments disclosed herein, the gNB 120 may transmit the data packet earlier which allows better load balancing and therefore enables to increase the number of UEs that can be supported with jitter requirements on a specific 5G NR carrier.

Applying the forwarding time may cause certain HARQ process(es) to be occupied for some time and thus it may not be possible to use them for other data while waiting for their data to be delivered. However, a UE 110 may be configured by the gNB 120 with a plurality of HARQ processes, for example sixteen HARQ processes, in order to enable smooth operation even while keeping some HARQ processes occasionally occupied. For example, gNB 120 may refrain from scheduling data for a certain HARQ process, in response to determining that the UE 110 is still holding data for that HARQ process, for example based on the forwarding time signaled by gNB 120. A further benefit is that the TSCAI information, for example information about the jitter and AN PDB control provided by the core network, may be kept at the gNB 120 and implicitly signaled to the UE 110 with only minor modifications to DCI parameters.

A further benefit is that jitter control can be offered at symbol level which the UE 110 is already synchronized to. This means that UE 110 does not necessarily need to be absolutely synchronized. For example, if propagation delay compensation is needed, the gNB 120 may take that into account when setting the symbol number for forwarding the packet.

Figure 4:
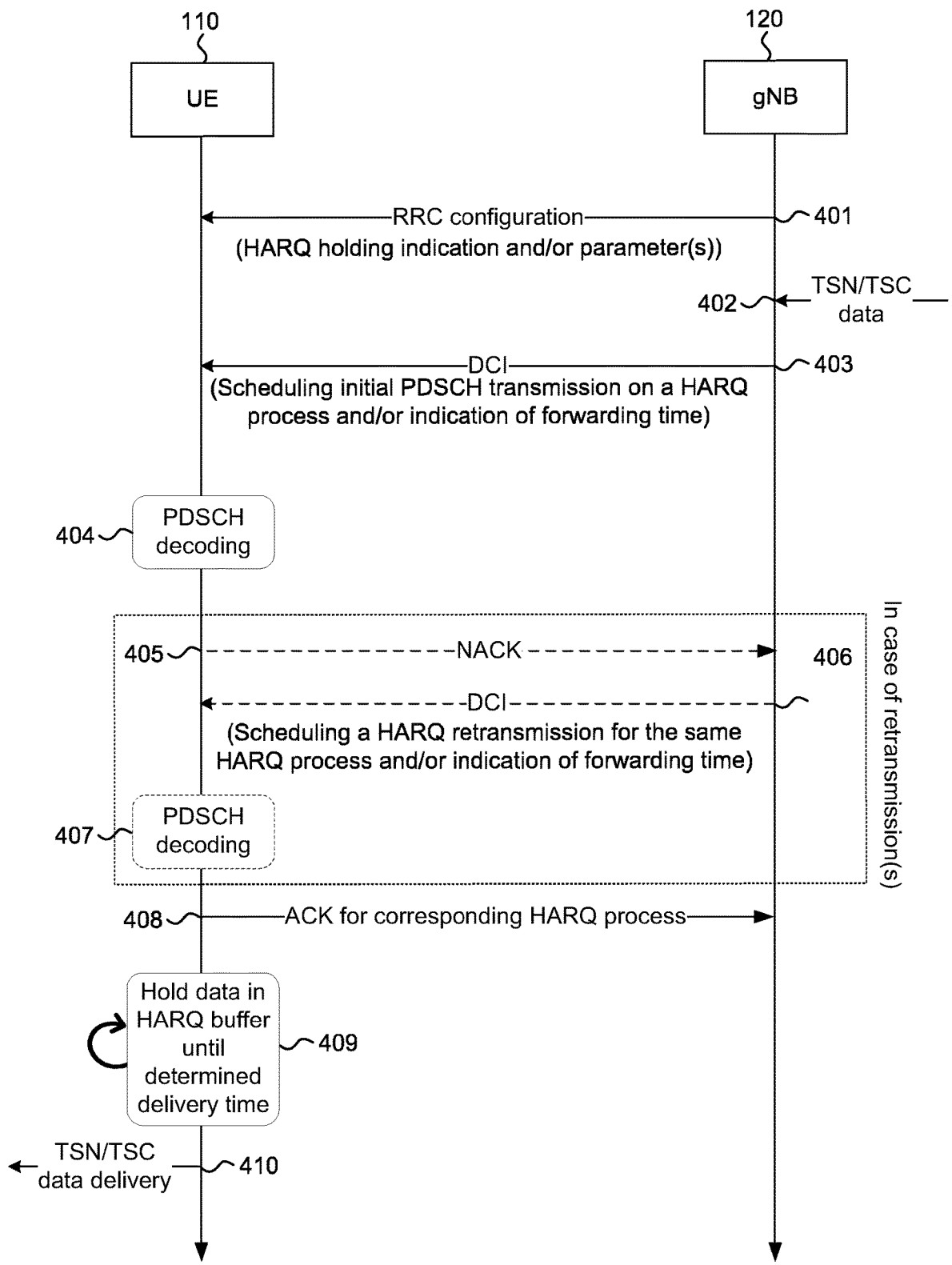
FIG. 4 illustrates an example of communication between a UE and a gNB to configure a forwarding time for received data packets, according to an example embodiment.

FIG. 4 illustrates an example of communication between a UE and a gNB to configure a forwarding time for received data packets, according to an example embodiment. Initially, the UE 110 may transmit a UE capability indication indicating capability of UE 110 to hold data in its HARQ buffer for jitter control.

At operation 401, the gNB 120 may transmit an RRC configuration to permit holding data of a HARQ process for or until a certain forwarding time. The RRC configuration comprising the forwarding time may be provided for example as one or more RRC configuration messages. The RRC configuration may comprise parameter(s) associated with holding the data in the HARQ buffer or definitions of associated signaling data provided by other means, for example in downlink control information. The RRC configuration may for example comprise a request to enable HARQ buffer holding. The request may be associated with a particular HARQ process, which may be identified by a corresponding HARQ process identifier (ID) in the RRC configuration.

The RRC configuration may further comprise a mapping between signaling field values, such as for example bit combinations, and associated parameter values. For example, the RRC configuration may comprise a mapping between different bit combinations and corresponding forwarding times (Y). The value of the forwarding time, defined for example as number of OFDM symbols, may be mapped to downlink control information bits for example as follows:

| Indication in DCI | Forwarding time (Y) |
| --- | --- |
| 000 | No hold |
| 001 | 7 |
| 010 | 14 |
| 011 | 28 |
| 100 | 42 |
| 101 | 56 |
| 110 | 70 |
| 111 | 84 |

Alternatively, the Y may be expressed as a time period, for example in milliseconds. For example, indication '000' in DCI may indicate that the UE 110 is instructed not to hold the received data in the HARQ buffer for jitter control purposes. The rest of the bit combinations may be mapped to specific forwarding delay values, for example within the range of 7 to 84 OFDM symbols. In response to receiving the RRC configuration, the UE 110 may configure the data to be delivered to higher layers from HARQ buffer based on the received indication of the forwarding time. Jitter control may therefore be efficiently implemented without separate hold-and-forward buffer.

At operation 402, the gNB 120 may receive data for transmission. The data may be for example TSN or TSC data. The gNB 120 may determine to configure a forwarding time for the data. The forwarding time may be configured for example in response to detecting a particular type of data, such as for example TSN, TSC, or other data with strict jitter requirements.

At operation 403, the gNB 120 may transmit a forwarding time parameter to UE 110. The forwarding time parameter may be associated with one or more data packets. The gNB 120 may further transmit information to schedule transmission of the data packet(s), for example transmission of the data packets on PDSCH. The scheduling information and/or an indication of the forwarding time parameter may be included in DCI, for example on PDCCH. The forwarding time may be indicated for example for one or more individual data packets, a particular type of data packets, or data packets designated to UE 110, or a subset thereof. The forwarding time may be further associated with a particular HARQ process. The forwarding time parameter may carry information about a time for holding the data packet(s) in the HARQ buffer of the UE 110, optionally for the associated HARQ process. The gNB 120 may therefore transmit an identifier of the HARQ process associated with the data packet(s) and the forwarding time parameter.

Based on the forwarding time parameter, the UE 110 may determine a delivery time for buffered data packets. The forwarding time may be relative to the transmission (reception) of the data packet(s). Upon reception of the data packet(s), the UE 110 may determine the delivery time based on at least the forwarding time parameter and the time of reception of the data packets. Furthermore, a processing delay of the data packets may be taken into account when determining the delivery time, as will be further described below. Alternatively, the forwarding time parameter may indicate an absolute time instant in a synchronized time space between the gNB 120 and the UE 110.

An indication of the forwarding time parameter may be provided in DCI scheduling an initial physical downlink shared channel (PDSCH) transmission on a HARQ process. The indication of the forwarding time parameter may be included for example in DCI format 1_1 or 1_2. The PDSCH and downlink control information are provided as examples of data and control channels, but it is appreciated that example embodiments may be applied to any suitable data and control channels.

After scheduling the PDSCH transmission with the DCI, the gNB 120 may transmit the data packet(s) associated with the indication of the forwarding time parameter. The data packets may be transmitted on the PDSCH. The UE 110 may receive the data packet(s). The UE 110 may further assign the data packet(s) to a HARQ buffer. The HARQ buffer may be used as a temporary data storage at UE 110 until the data packet(s) have been correctly decoded. The HARQ buffer may be allocated for the HARQ process indicated by gNB 120. However, according to an example embodiment the UE 110 may receive indications of a plurality of forwarding time parameters associated with corresponding plurality of HARQ processes. In this case, the UE 110 may assign the data packet(s) associated with the different HARQ processes to corresponding plurality of HARQ buffers. Each HARQ buffer may be associated with one of the plurality of forwarding time parameters.

At operation 404, the UE 110 may decode the data packet(s) received over PDSCH. If the data packet(s) can not be correctly decoded, the UE 110 may transmit a HARQ negative acknowledgement (NACK) of the data packet(s) to gNB 120, at operation 405.

At operation 406, the gNB 120 may transmit further downlink control information to schedule a HARQ retransmission of the data packet(s) for the same HARQ process. The gNB 120 may further indicate an updated forwarding time parameter for the retransmitted data packet(s). Alternatively, the gNB 120 may not provide an updated forwarding time parameter and the UE 110 may use the forwarding time parameter initially indicated at 403 also for the retransmitted data packet(s). The forwarding time parameter and/or the updated forwarding time parameter may be relative to the initial transmission of the data packet(s) or the retransmission of the data packet(s).

At operation 407, the UE 110 may decode the retransmitted data packet(s) received over the PDSCH. The data packet(s) may be assigned to the HARQ buffer upon reception at UE 110.

It is noted that operations 405 to 407 may be optional and performed in case retransmission is needed. Otherwise, these operations may be omitted. It is also noted that operations 405 to 407 may be iterated until a predetermined number of retransmissions, for example four retransmissions, or until the data packet(s) have been successfully decoded. In response to successful decoding of the initial transmission at 404, or successful decoding of a retransmission at 407, the UE may move to operation 408.

At operation 408, the UE 110 may transmit an acknowledgement of the data packet(s) to gNB 120. The acknowledgement may be transmitted in response to successful decoding of the data packet(s), possibly after a number of retransmissions.

At operation 409, the UE 110 may hold the data packet(s) in the HARQ buffer until a determined delivery time. This enables the jitter of the data flow to be reduced by means of the HARQ buffer and therefore enables an efficient solution for jitter control. In case of multiple HARQ processes and buffers, the UE 110 may apply the forwarding time parameter associated with each buffer to determine corresponding delivery times for each buffer.

As discussed above, the gNB 120 may transmit the forwarding time parameter to UE 110. The forwarding time parameter may comprise for example a number of symbols relative to the scheduled data packet(s), for example the beginning or end of the scheduled PDSCH carrying the data packet(s). According to an example embodiment, a specific field for indicating the forwarding time parameter may be added in the DCI scheduling the PDSCH. This field may be used to indicate that the UE 110 shall forward the received data to upper layers at a certain time in the future. Different signaling options are possible, however.

According to an example embodiment, the UE 110 may determine the delivery time as X+Y symbols after the end (or start) of the transmission on the PDSCH. Value of the forwarding time parameter Y may be determined based on DCI, for example a ForwardTime field in the DCI. A set of possible values of Y may be configured by higher layer signaling, such as for example RRC signaling. A set of possible values of Y may also be preconfigured at the UE 110, for example based on fixed values provided in the specifications. Parameter X may correspond to a processing time, for example a minimum required processing time for PDSCH, e.g. N1 of 5G NR, or preconfigured at the UE 110 based on values fixed in the specifications or indicated by the UE 110 as a UE capability. The UE 110 may therefore determine the delivery time based on a sum of X and the indicated forwarding time parameter (Y).

If X=0, the gNB 120, or in general the network, may determine Y such that the indicated value of Y is not below the processing time (X). Alternatively, the value of X could be configured by higher layers. Since it is possible that X=0, the UE 110 may determine the delivery time by adding the indicated forwarding time to the reception time of the data packet(s).

According to an example embodiment, the ForwardTime field may comprise N bits. The 2N possible values of the forwarding time parameter may be higher-layer configured, e.g. via RRC signaling. One of the possible values, for example all '0's, may be used to indicate a permission to deliver the data packet(s) at any point of time. In response to receiving such signaling, the UE 110 may configure its HARQ process(es) not to apply any forwarding time restriction.

According to an example embodiment, the forwarding time Y may correspond to Y=A*B symbols where A is provided by the ForwardTime field and the granularity of B could be predetermined, for example one symbol, or higher-layer configured. For example, if the desired jitter window is 0.5 ms, the network may configure B=14 symbols (0.5 ms for 30 kHz sub-carrier spacing) and the three-bit Forward-Time field may be used to indicate forwarding times in the interval of 0 ms to 4 ms interval with 0.5 ms granularity. The forwarding time may be therefore determined based on a multiplication of a value of a signaling field of DCI and a granularity parameter, which may be pre-configured or configurable by higher layer signaling, for example RRC signaling. The granularity parameter may comprise a positive integer.

According to an example embodiment, the UE 110 may be configured to forward the received data packet to higher layers substantially at the same time as the UE 110 transmits a positive acknowledgement (ACK) to gNB 120, for example at the beginning of the physical uplink control channel (PUCCH) or physical uplink shared channel (PUSCH) transmission containing the uplink control information (UCI). This may be implemented for example by the gNB 120 indicating or configuring the UE 110 for using a HARQ feedback timing indicator as the indication of the forwarding time parameter. The indication of the forwarding time parameter may therefore comprise the indication of the HARQ feedback timing indicator, for example a k1 parameter (PDSCH-to-HARQ feedback timing indicator) of 3GPP. This enables the gNB 120 to control the forwarding time of the data packet without significant (or any) changes to DCI. In this case, the UE 110 may determine the delivery time to be substantially equal to the transmission time for the positive acknowledgement (ACK).

The indication or configuration of using the HARQ feedback timing indication for this new purpose may be provided for example through a 1-bit field indication (flag) in the DCI, by sending the DCI using a dedicated RNTI (radio network temporary identifier), or by pre-configuration via RRC configuration, which may be linked to a specific DCI format, e.g. 1_1 or 1_2. If the UE 110 is not configured or indicated to use the HARQ feedback timing indication as the indication of the forwarding time parameter and if the UE 110 was also not indicated with a forward time, the UE 110 may forward the data as soon it decodes successfully. A dedicated RNTI may comprise an RNTI bit sequence dedicated for this purpose. The dedicated RNTI may be used to scramble a CRC (cyclic redundancy check) field of radio channel messages. This enables the UE 110 to detect the RNTI associated with transmission of the DCI and therefore to understand the indication or configuration of using the HARQ feedback timing indication for this new purpose. An advantage of this example embodiment is that it does not require new DCI fields and it allows to spread out the PDSCH allocations from multiple users across different slots/mini-slots, even if the forwarding times were the same across different users. This example embodiment may be used for example when scheduling 'one-shot' transmissions with a relatively low BLER target and when retransmissions are not applicable.

According to an example embodiment, the configuration of when the UE 110 is to deliver the received data to higher layers may be configured by RRC signaling, for example along with the configuration of semi-persistent scheduling (SPS) or via activation DCI of SPS. For example, the UE 110 may determine the delivery time to be X+Y symbols after the end or the beginning of the SPS PDSCH in a SPS period. Therefore, the forwarding time parameter may be relative to a semi-persistently scheduled transmission of the data packet(s). The forwarding time parameter may be associated with configuration of the semi-persistent scheduling of the transmission of the at least one data packet. For example, the configuration of the forwarding time parameter may be included in RRC signaling used to configure the semi-persistent scheduling of the data packet. Alternatively, an indication of the forwarding time parameter may be included in DCI indicated to activate the semi-persistent scheduling of the transmission of the data packet(s).

As discussed above, there are various ways to configure the forwarding time for UE 110. Once the UE 110 has determined the associated delivery time, it may determine when to deliver the buffered data packet(s) to higher protocol layer(s).

At operation 410, the UE 110 may detect the determined delivery time. For example, the UE 110 may detect that a time instant defined by parameters X and Y has been reached. The UE 110 may forward the data packet from the HARQ buffer, for example in response to detecting the delivery time. The data may comprise TSN data, TSC data, or other data, as described above. The data may be forwarded to higher (upper) layer(s) of the protocol stack. For example, the MAC layer may forward the data to the RLC layer.

According to an example embodiment, the gNB 120 may instruct the UE 110 to update the delivery time or instruct the UE 110 to immediately forward the data of a HARQ process. The gNB 120 may for example transmit a DCI format comprising an identifier of the HARQ process and the forwarding time parameter for the identified HARQ process. The signaling may include options to immediately forward the data to higher layers, or to discard the data from the HARQ buffer. This may be pre-configured behaviour, for example by RRC, or indicated in a DCI field. The gNB 120 may also instruct the UE 110 to (immediately) forward at least one previous successfully received data packet scheduled on the same HARQ process to higher layers, if the previous data has not yet been forwarded, and if a DCI with new data indicator (NDI) toggled is received for the same HARQ process (i.e. if gNB decided to use that HARQ process for a new transmission). The gNB 120 may provide such instruction for example by transmitting a DCI scheduling a PDSCH allocation for the corresponding HARQ process with the toggled new data indicator (NDI). The NDI may be used to indicate whether a scheduled transmission is a new transmission or a retransmission. For example, if the NDI value is toggled (changed) compared to a previous transmission for the same HARQ process, the UE 110 may determine that the transmission is a new transmission rather than a retransmission.

In general, the gNB 120 may transmit a request to discard previous successfully received data packet(s) from the HARQ buffer. The request may be transmitted before the delivery time is reached at UE 110. The request may be associated with a particular HARQ process, which may be indicated along with the request. In response to receiving the request, the UE 110 may discard the previous successfully received data packet(s) from the HARQ buffer. The UE 110 may determine the associated HARQ buffer based on the identifier of the indicated HARQ process.

According to an example embodiment, the delivery time of the packet may not be relative to the arrival time of the incoming data packet(s), but rather according to an absolutely synchronized time window, for example with respect to an universal clock. If the delivery time is indicated relative to the PDSCH reception at the UE 110, the gNB 120 may account or compensate for the propagation delay prior to determining the point of time when the received data packet(s) should be forwarded to higher layers at the UE 110. The gNB 120 may estimate or measure the propagation delay between the gNB 120 and the UE 110.

Figure 5:
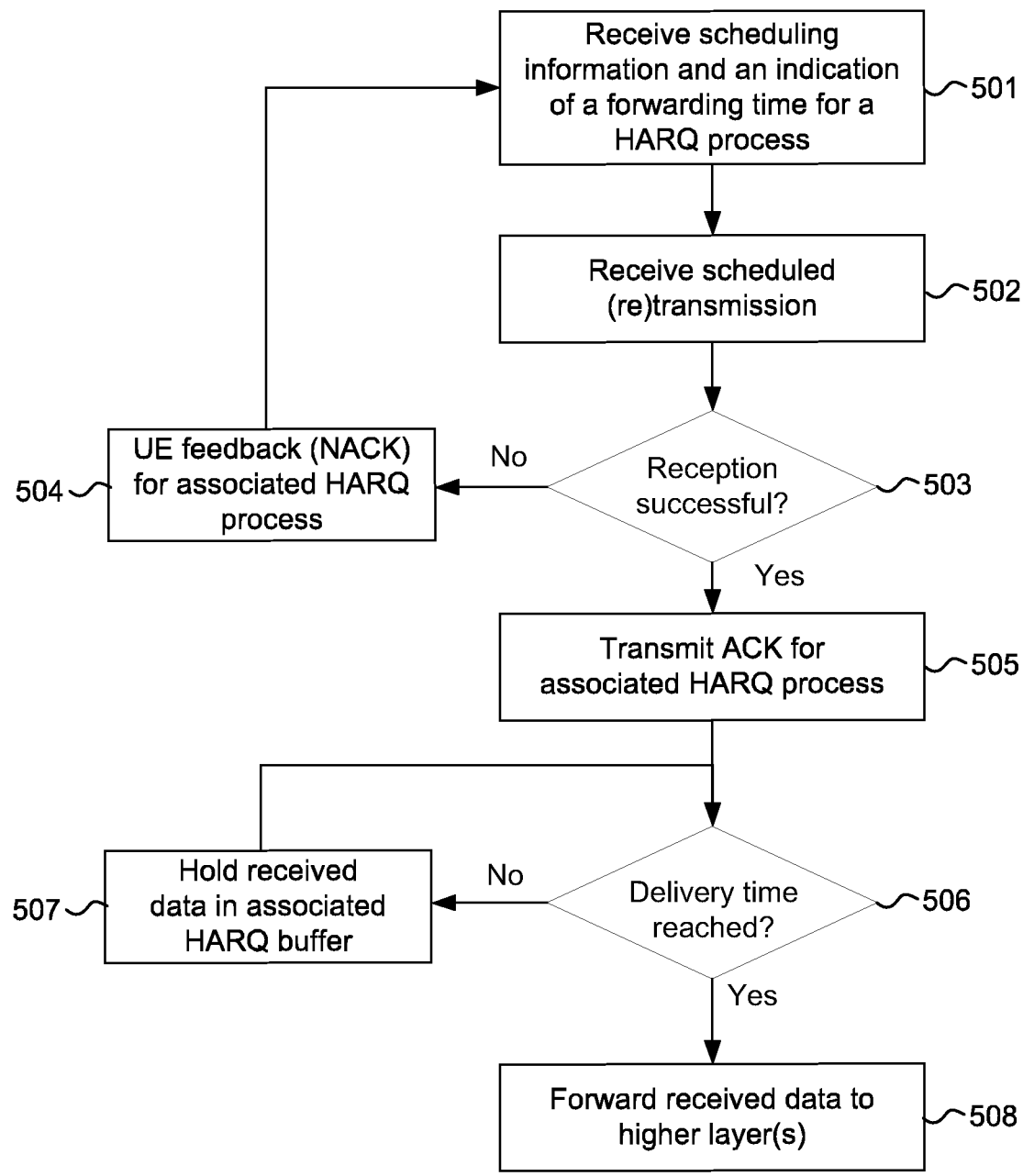
FIG. 5 illustrates an example of a flow chart for applying a forwarding time for received data packets at a UE, according to an example embodiment.

FIG. 5 illustrates an example of a flow chart for applying a forwarding time for received data packets at a UE, according to an example embodiment.

At operation 501, the UE 110 may receive scheduling information and a forwarding time parameter for a HARQ process. This information may be received via DCI, for example as described with reference to operation 403 above. The scheduling information may be associated with one or more data packets.

At operation 502, the UE 110 may receive the scheduled transmission(s), for example on the PDSCH. The transmission(s) may comprise the scheduled data packet(s). Optionally the UE 110 may receive one or more retransmissions of the scheduled data packets.

At operation 503, the UE 110 may determine whether the scheduled (re)transmission(s) were successfully received. For example, the UE 110 may determine whether it was able to correctly decode the received data packets, for example by means of forward error correction (FEC). If the reception was not successful, the UE 110 may move to operation 504. If the reception was successful, the UE 110 may move to operation 505.

At operation 504, the UE 110 may transmit feedback (NACK) for the associated HARQ process to gNB 120, for example similar to operation 405. The UE 110 may then move back to operation 501 to receive further scheduling information for a retransmission for the same HARQ process. As discussed above, the UE 110 may or may not receive updated forwarding time parameter for the retransmission, which the UE 110 may receive at operation 502.

At operation 505, the UE 110 may transmit an acknowledgement (ACK) for the associated HARQ process, for example in response to detecting successful reception at operation 503. The acknowledgement may be transmitted as described with reference to operation 408. The UE 110 may further determine the delivery time based on at least the forwarding time parameter.

At operation 506, the UE 110 may determine whether the delivery time has been reached. If the forwarding time is indicated as being relative to reception of the scheduled transmission, the UE 110 may for example initiate a timer upon reception of the scheduled transmission based on the indication of the forwarding time received at 501, optionally with one or more of the parameters X, A, and B, as described above. If the timer has not expired, the UE 110 may determine that the delivery time has not been reached.

Alternatively, if the forwarding time is indicated as an absolute time, the UE 110 may monitor its synchronized clock and determine whether the indicated absolute time has been reached. If the indicated absolute time has been reached, the UE 110 may determine that the delivery time has been reached.

If the delivery time has not been reached, the UE 110 may move to operation 507 to hold the received data in the associated HARQ buffer, for example as described with reference to operation 409.

If the delivery time has not been reached, the UE 110 may move to operation 508 to forward the received data to higher layers, for example as described with reference to operation 410.

Figure 6:
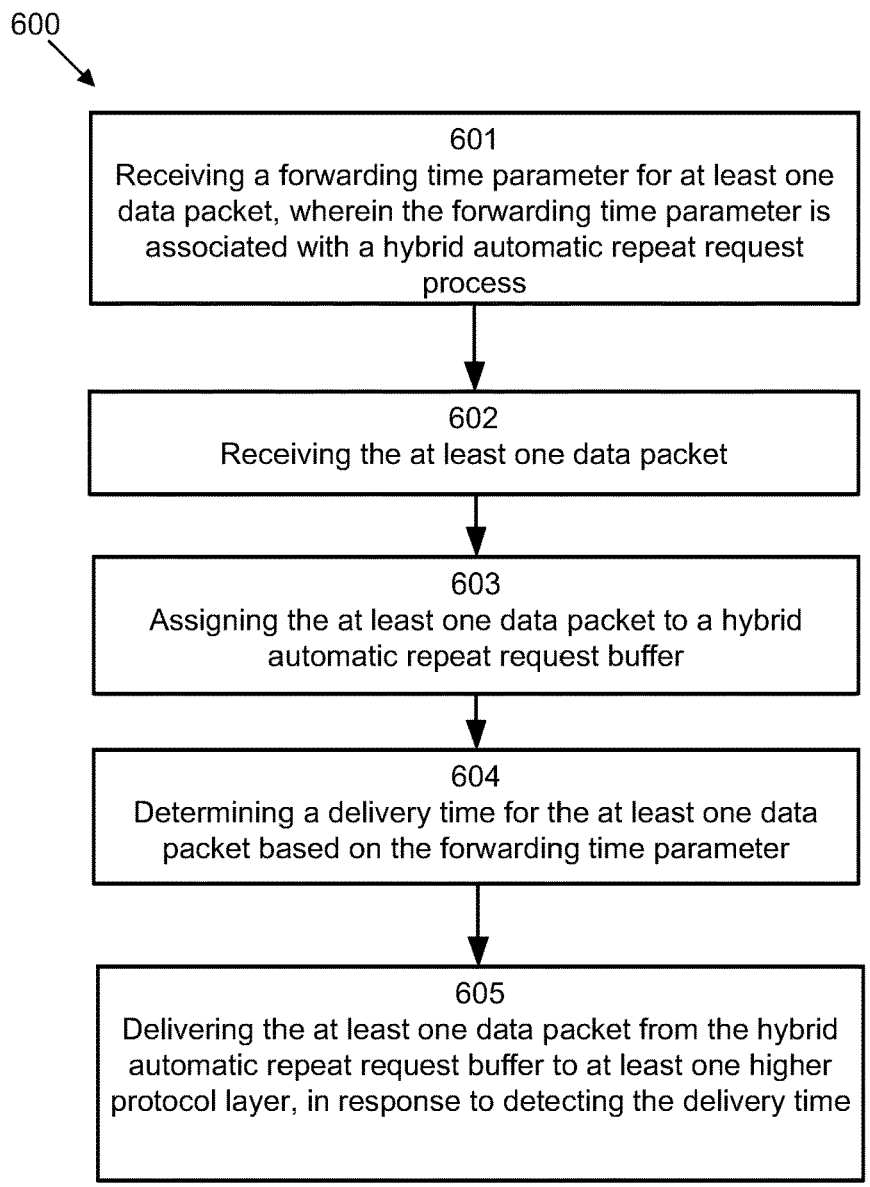
FIG. 6 illustrates an example of a method for applying a forwarding time, according to an example embodiment.

FIG. 6 illustrates an example of a method for applying a forwarding time, according to an example embodiment.

At 601, the method may comprise receiving a forwarding time parameter for at least one data packet, wherein the forwarding time parameter is associated with a hybrid automatic repeat request process.

At 602, the method may comprise receiving the at least one data packet.

At 603, the method may comprise assigning the at least one data packet to a hybrid automatic repeat request buffer.

At 604, the method may comprise determining a delivery time for the at least one data packet based on the forwarding time parameter.

At 605, the method may comprise delivering the at least one data packet from the hybrid automatic repeat request buffer to at least one higher protocol layer, in response to detecting the delivery time.

Figure 7:
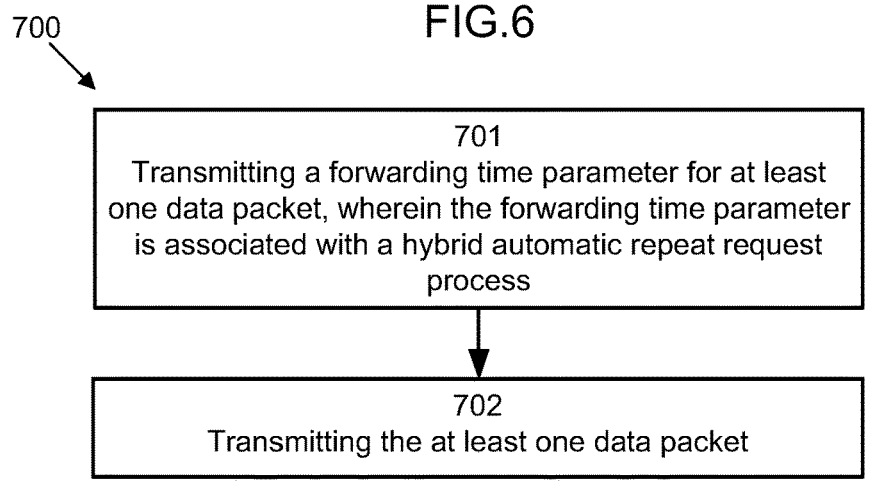
FIG. 7 illustrates an example of a method for indicating or configuring a forwarding time, according to an example embodiment.

FIG. 7 illustrates an example of a method for indicating or configuring a forwarding time, according to an example embodiment.

At 701, the method may comprise transmitting a forwarding time parameter for at least one data packet, wherein the forwarding time parameter is associated with a hybrid automatic repeat request process.

At 702, the method may comprise transmitting the at least one data packet.

Further features of the methods directly result from the functionalities and parameters of the UE 110 and/or the gNB 120, as described in the appended claims and throughout the specification, and are therefore not repeated here. Different variations of the methods may be also applied, as described in connection with the various example embodiments.

An apparatus, for example a client node such as a UE 110, or a network node such as gNB 120 may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
at least one processor; and
at least one non-transitory memory storing instructions that, when executed with the at least one processor, cause the apparatus at least to:
receive a forwarding time parameter for at least one data packet, wherein the forwarding time parameter is associated with a hybrid automatic repeat request process;
receive the at least one data packet;
assign the at least one data packet to a hybrid automatic repeat request buffer;
determine a delivery time for the at least one data packet based on the forwarding time parameter;
deliver the at least one data packet from the hybrid automatic repeat request buffer to at least one higher protocol layer, in response to detecting the delivery time;
receive an indication of the forwarding time parameter in downlink control information; and
receive a radio resource control configuration comprising a mapping between values of the forwarding time parameter and values of a downlink control information field comprising the indication of the forwarding time parameter.

2. The apparatus according to claim 1, wherein the instructions, when executed with the at least one processor, cause the apparatus to receive an identifier of the hybrid automatic repeat request process associated with the at least one data packet and the forwarding time parameter.

3. The apparatus according to claim 1, wherein the instructions, when executed with the at least one processor, cause the apparatus to receive a radio resource control configuration comprising the forwarding time parameter, wherein the forwarding time parameter is relative to a semi-persistently scheduled transmission of the at least one data packet.

4. The apparatus according to claim 3, wherein the indication of the forwarding time parameter comprises an indication of a hybrid automatic repeat request feedback timing indicator, and wherein the instructions, when executed with the at least one processor, cause the apparatus to:
receive an indication or configuration of use of the hybrid automatic repeat request timing indicator as the indication of the forwarding time parameter; and
transmit an acknowledgement of the at least one data packet and forward the at least one data packet, in response to detecting the delivery time.

5. The apparatus according to claim 4, wherein the indication or configuration of the use of the hybrid automatic repeat request timing indicator as the indication of the forwarding time comprises one of:
a flag in downlink control information,
a dedicated radio network temporary identifier associated with transmission of the downlink control information, or
a radio resource control configuration.

6. The apparatus according to claim 3, wherein the forwarding time parameter is associated with configuration of the semi-persistently scheduled transmission of the at least one data packet, or wherein the forwarding time parameter is included in downlink control information indicated to activate the semi-persistent scheduling of the transmission of the at least one data packet.

7. The apparatus according to claim 3, wherein the instructions, when executed with the at least one processor, cause the apparatus to:
transmit a negative acknowledgment of the at least one data packet;
receive an updated forwarding time parameter for the at least one data packet;
receive at least one retransmission of the at least one data packet; and
update the delivery time for the at least one data packet based on the updated forwarding time parameter.

8. The apparatus according to claim 6, wherein the instructions, when executed with the at least one processor, cause the apparatus to transmit an identifier of the hybrid automatic repeat request process associated with the at least one data packet and the forwarding time parameter.

9. The apparatus according to claim 1, wherein the instructions, when executed with the at least one processor, cause the apparatus to:
receive, before the delivery time, a request to forward at least one previous successfully received data packet from the hybrid automatic repeat request buffer; and
forward the at least one previous successfully received data packet from the hybrid automatic repeat request buffer before the delivery time, in response to the request to forward the at least one previous successfully received data packet from the hybrid automatic repeat request buffer.

10. The apparatus according to claim 9, wherein the request to forward the at least one previous successfully received data packet from the hybrid automatic repeat request buffer comprises downlink control information and wherein the instructions, when executed with the at least one processor, schedule a transmission of the at least one data packet with a toggled new data indicator, and wherein the transmission of the at least one data packet is associated with the hybrid automatic repeat request process.

11. The apparatus according to claim 1, wherein the instructions, when executed with the at least one processor, cause the apparatus to:
receive, before the delivery time, a request to discard at least one previous successfully received data packet from the hybrid automatic repeat request buffer; and
discard the at least one previous successfully received data packet from the hybrid automatic repeat request buffer, in response to the request to discard the at least one previous successfully received data packet from the hybrid automatic repeat request buffer.

12. An apparatus, comprising:
at least one processor; and
at least one non-transitory memory storing instructions that, when executed with the at least one processor, cause the apparatus at least to:
transmit a forwarding time parameter for at least one data packet, wherein the forwarding time parameter is associated with a hybrid automatic repeat request process;
transmit the at least one data packet;
transmit an indication of the forwarding time parameter in downlink control information; and
transmit a radio resource control configuration comprising a mapping between values of the forwarding time parameter and values of a downlink control information field comprising the indication of the forwarding time parameter.

13. The apparatus according to any of claim 12, wherein the instructions, when executed with the at least one processor, cause the apparatus to:
receive a negative acknowledgement of the at least one data packet;
transmit an updated forwarding time parameter for the at least one data packet;
and
retransmit the at least one data packet.

14. The apparatus according to claim 13, wherein the indication of the forwarding time parameter comprises an indication of a hybrid automatic repeat request feedback timing indicator, and wherein the instructions, when executed with the at least one processor, cause the apparatus to transmit an indication or configuration of use of the hybrid automatic repeat request timing indicator as the indication of the forwarding time parameter.

15. The apparatus according to claim 14, wherein the indication or configuration of the use of the hybrid automatic repeat request timing indicator as the indication of the forwarding time comprises one of:
a flag in downlink control information,
a dedicated radio network temporary identifier associated with transmission of the downlink control information, or
a radio resource control configuration.

16. The apparatus according to claim 13, wherein the instructions, when executed with the at least one processor, cause the apparatus to transmit a request to discard at least one previous successfully received data packet from a hybrid automatic repeat request buffer.

17. The apparatus according to claim 12, wherein the instructions, when executed with the at least one processor, cause the apparatus to transmit a request to forward at least one previous successfully received data packet from a hybrid automatic repeat request buffer.

18. The apparatus according to claim 17, wherein the request to forward the at least one previous successfully received data packet from the hybrid automatic repeat request buffer comprises downlink control information and wherein the instructions, when executed with the at least one processor, schedule a transmission of the at least one data packet with a toggled new data indicator, and wherein the transmission of the at least one data packet is associated with the hybrid automatic repeat request process.

19. A method, comprising:
- receiving a forwarding time parameter for at least one data packet, wherein the forwarding time parameter is associated with a hybrid automatic repeat request process;
- receiving the at least one data packet;
- assigning the at least one data packet to a hybrid automatic repeat request buffer;
- determining a delivery time for the at least one data packet based on the forwarding time parameter;
- delivering the at least one data packet from the hybrid automatic repeat request buffer to at least one higher protocol layer, in response to detecting the delivery time;
- receiving an indication of the forwarding time parameter in downlink control information; and
- receiving a radio resource control configuration comprising a mapping between values of the forwarding time parameter and values of a downlink control information field comprising indication of the forwarding time parameter.

20. A non-transitory program storage device readable with an apparatus tangibly embodying a program of instructions executable with the apparatus for performing the method of claim 19.

* * * * *